United States Patent
Wayne et al.

(10) Patent No.: US 9,774,063 B2
(45) Date of Patent: Sep. 26, 2017

(54) BATTERY PACK ASSEMBLY HAVING THERMAL TRANSFER SHEETS

(75) Inventors: Ryan J. Wayne, Brecksville, OH (US); Jonathan Andrew Taylor, Cleveland, OH (US); Martin David Smalc, Parma, OH (US)

(73) Assignee: Advanced Energy Technologies LLC, Lakewood, OH (US)

( * ) Notice: Subject to any disclaimer, the term of this patent is extended or adjusted under 35 U.S.C. 154(b) by 10 days.

(21) Appl. No.: 14/235,531

(22) PCT Filed: Aug. 13, 2012

(86) PCT No.: PCT/US2012/050583
§ 371 (c)(1),
(2), (4) Date: May 16, 2014

(87) PCT Pub. No.: WO2013/025608
PCT Pub. Date: Feb. 21, 2013

(65) Prior Publication Data
US 2014/0248515 A1 Sep. 4, 2014

Related U.S. Application Data

(60) Provisional application No. 61/523,488, filed on Aug. 15, 2011, provisional application No. 61/655,312, filed on Jun. 4, 2012.

(51) Int. Cl.
*H01M 10/65* (2014.01)
*H01M 10/64* (2014.01)
(Continued)

(52) U.S. Cl.
CPC ..... *H01M 10/5034* (2013.01); *H01M 10/613* (2015.04); *H01M 10/647* (2015.04);
(Continued)

(58) Field of Classification Search
CPC .... H01M 2/10; H01M 2/1077; H01M 10/625; H01M 10/613; H01M 10/60;
(Continued)

(56) References Cited

U.S. PATENT DOCUMENTS 4,957,830 A 9/1990 Jones
5,256,502 A * 10/1993 Kump ................. H01M 2/1005
429/150
(Continued)

FOREIGN PATENT DOCUMENTS

EP 1783097 A1 * 5/2007 ............. C01B 31/04
WO WO 2011/013905 A1 * 2/2011 ............ H01M 10/50
WO 2011/101391 A1 8/2011

OTHER PUBLICATIONS

USPTO, International Search Report and Written Opinion for PCT/US12/50583, Mailed on Oct. 23, 2012.
(Continued)

Primary Examiner — Kenneth Douyette (57) ABSTRACT

A battery pack includes a plurality of cell assemblies each of which include one or more prismatic batteries. A frame has legs sized and configured to be positioned around the prismatic batteries. At least one leg includes a rear face, curved outer edge and a side face. A thermal transfer sheet is made from a sheet of a compressed mass of exfoliated graphite particles. Each thermal transfer sheet is positioned to contact the major surface of the at least one prismatic battery and is bent over the curved outer edge. At least a portion of each thermal transfer sheet is secured between a heat sink and the side face.

20 Claims, 8 Drawing Sheets

(51) Int. Cl.
  *H01M 10/61* (2014.01)
  *H01M 10/647* (2014.01)
  *H01M 10/6555* (2014.01)
  *H01M 10/655* (2014.01)
  *H01M 10/613* (2014.01)
  *H01M 10/656* (2014.01)

(52) U.S. Cl.
  CPC ......... *H01M 10/65* (2015.04); *H01M 10/655* (2015.04); *H01M 10/656* (2015.04); *H01M 10/6555* (2015.04)

(58) Field of Classification Search
  CPC ........... H01M 10/655; H01M 10/5055; H01M 10/5046; H01M 10/5032; H01M 10/1016; H01M 10/5004
  See application file for complete search history.

(56) References Cited

U.S. PATENT DOCUMENTS

| | | | |
|---|---|---|---|
| 5,731,568 | A | 3/1998 | Malecek |
| 8,304,104 | B2 | 11/2012 | Lee |
| 2003/0017384 | A1 | 1/2003 | Marukawa et al. |
| 2004/0001988 | A1 | 1/2004 | Yazici et al. |
| 2004/0016455 | A1* | 1/2004 | Oogami ............... H01M 2/02 136/244 |
| 2005/0111167 | A1* | 5/2005 | Yamaguchi et al. .......... 361/676 |
| 2008/0090137 | A1 | 4/2008 | Buck et al. |
| 2010/0071979 | A1* | 3/2010 | Heichal et al. ............. 180/68.5 |
| 2010/0266883 | A1 | 10/2010 | Koetting |
| 2010/0273042 | A1 | 10/2010 | Buck et al. |
| 2010/0276132 | A1* | 11/2010 | Payne ................. F28D 15/0266 165/169 |
| 2011/0008665 | A1 | 1/2011 | Yoon |
| 2011/0104532 | A1* | 5/2011 | Buck et al. .................... 429/82 |
| 2011/0114342 | A1* | 5/2011 | Ono et al. ...................... 169/45 |
| 2011/0151300 | A1* | 6/2011 | Herrmann ......... H01M 10/0413 429/120 |
| 2012/0088128 | A1 | 4/2012 | Matsuura et al. |
| 2012/0107664 | A1* | 5/2012 | Lee et al. ...................... 429/120 |
| 2013/0209858 | A1 | 8/2013 | Schmitt et al. |

OTHER PUBLICATIONS

USPTO, International Preliminary Report on Patentability for PCT/US12/50583, Mailed on Feb. 18, 2014.

\* cited by examiner

BATTERY PACK ASSEMBLY HAVING THERMAL TRANSFER SHEETS

BACKGROUND

Batteries and cells are important energy storage devices well known in the art. The batteries and cells typically comprise electrodes and an ion conducting electrolyte positioned therebetween. Battery packs that contain lithium ion batteries are increasingly popular for automotive applications and various commercial electronic devices because they are rechargeable and have little or no memory effect. Storing and operating the lithium ion battery at an optimal operating temperature is very important to allow the battery to maintain a charge for an extended period of time.

Opportunities exist to improve upon prior battery pack assemblies to improve operating temperatures to ensure the longest possible life cycle, rated capacity, and nominal charge and discharge rates.

SUMMARY OF THE EMBODIMENTS

According to one aspect of the embodiments, a battery pack includes a plurality of cell assemblies each of which include one or more prismatic batteries. A frame has legs sized and configured to be positioned around the prismatic batteries. At least one leg includes a rear face, curved outer edge and a side face. A thermal transfer sheet is made from a sheet of a compressed mass of exfoliated graphite particles. Each thermal transfer sheet is positioned to contact the major surface of the at least one prismatic battery and is bent over the curved outer edge. At least a portion of each thermal transfer sheet is secured between a heat sink and the side face.

According to another aspect, a battery pack includes a plurality of cell assemblies each of which include at least one prismatic battery having opposed major surfaces. A frame has a plurality of legs sized and configured to be positioned around the prismatic battery. A fluid conduit extends along at least one of the plurality of legs. A thermal transfer sheet is made from a sheet of flexible graphite and has opposed major surfaces. The thermal transfer sheet has a central portion and at least one tab. The first major surface of the central portion contacts at least one of the major surfaces of the prismatic battery and the other major surface of the central portion is at least partially covered by the tab. The tab is folded over at least a portion of the fluid conduit.

DETAILED DESCRIPTION OF THE EMBODIMENTS

Large format prismatic lithium-ion cells have certain advantages over conventional prismatic or cylindrical cells. They have not only higher energy density, but also substantially lower possibility of battery failure due to "hot" cell problems, when the cells are used in multi-cell battery packs. Electrically, a battery pack assembly is made by assembling a plurality of prismatic lithium-ion cells in series to add up voltage, or in parallel which increases capacity.

In one embodiment, the prismatic lithium-ion cell is generally rectangular or square shaped and has a thickness of from about 1 mm to about 10 mm. More preferably, the cell has a thickness of from about 3 mm to about 6 mm. In one embodiment of the battery pack, the prismatic lithium-ion cell has opposed major surfaces, each major surface footprint being at least 8 square inches, more preferably a footprint of at least 16. In one embodiment, the footprint is from about 49 square inches to about 400 square inches. In another embodiment, the footprint is from about 16 square inches to about 2500 square inches and the most preferably a footprint is from about 400 square inches to about 1600 square inches.

The case of each battery cell may be made of a hardened metal and/or plastic casing. Alternately, the case may be aluminum foil-laminated plastic film. The battery cell case is preferably made with aluminum foil-laminated plastic film, which has a thickness of from about 20 µm to about 200 µm. More preferably, the aluminum foil-laminated plastic film has a thickness of from about 30 µm to about 100 µm. Most preferably, aluminum foil-laminated plastic film has a thickness of from about 40 µm to about 50 µm. The positive electrode may be a lithium-ion positive electrode, the negative electrode may be a lithium-ion negative electrode and the electrolyte may be a lithium-ion electrolyte. Further, the electrolyte may be a liquid lithium-ion electrolyte or a polymer lithium-ion electrolyte.

Preferably, the lithium-ion cell has a specific energy density of greater than 200 wh/kg, more preferably greater than 210 wh/kg and the most preferably about 220 wh/kg or greater. In yet another embodiment, the large format lithium-ion cell has an energy density of at least 450 wh/L, preferably at least 500 wh/L, more preferably at least 510 wh/L and most preferably at least 520 wh/L. In still another embodiment, the large format lithium-ion battery pack has an energy storage capacity of at least 16 kWh, preferably at least 24 kWh, more preferably at least 53 kWh and most preferably at least 100 kWh.

As used herein, the term "cell" or "battery cell" means an electrochemical cell made of at least one positive electrode, at least one negative electrode, an electrolyte, and a separator membrane. The term "cell" and "battery cell" are used interchangeably. The "battery" or "battery pack" means an electric storage device made of more than two cells. The terms "battery" and "battery pack" are used interchangeably.

Large format prismatic cells are advantageously assembled into battery packs in a stacked configuration, wherein the major surfaces of each cell are facing the major surfaces of adjacent cells. This stacked arrangement maximizes the energy density, but is not conducive to transferring the heat away from the cells. This is particularly true of the interior cells of the battery pack located relatively far from one of the exterior surfaces of the battery pack. To facilitate heat transfer, thermally conducting sheets or plates "heat spreaders" can be inserted in the spaces between the stacked prismatic cells. The heat spreaders improve performance and life of the cells by reducing thermal gradients in the plane of the sheet and transporting heat directly to the surroundings of the pack or to a heat sink.

Figure 1:
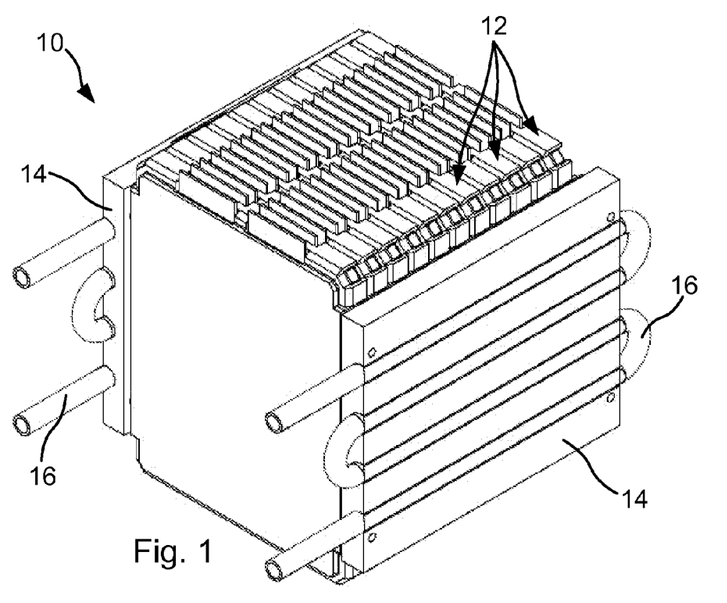
FIG. 1 is an isometric view of a battery pack assembly.

With reference now to FIG. 1, a battery pack is shown and generally indicated by the numeral 10. Battery pack 10 includes a plurality of cell assemblies 12 which, as will be described in greater detail below, may be arranged in an interconnected stacked configuration. In one embodiment, the battery pack further includes a pair of heat sinks 14 positioned on opposed sides of the stack of cell assemblies 12. In other embodiments, only one heat sink 14 may be provided. It should be appreciated that the battery pack 10 may be carried or contained in an outer housing (not shown) which may act to protect the pack 10 from contamination, temperature, vibration, and/or shock.

In one embodiment, heat sink 14 may be a cold plate or manifold having pipes 16 or other passageways through which a thermal transfer fluid flows. In other embodiments, the heat sink may not include a thermal transfer fluid, but instead includes surface features, such as fins, to increase effective surface area. In this or other embodiments, heat sink 14 may be made from a thermally conductive metal including, for example, copper or aluminum. In other embodiments, the heat sink 14 may be made from a graphite based material. In still further embodiments, heat sink may be made from compressed expanded natural graphite. In this or other embodiments, the compressed expanded natural graphite may be resin impregnated. In this or other embodiments, heat sink 14 may include phase change materials encapsulated therein. In still other embodiments, heat sink 14 may comprise the external surface or housing of a device.

Figure 3:
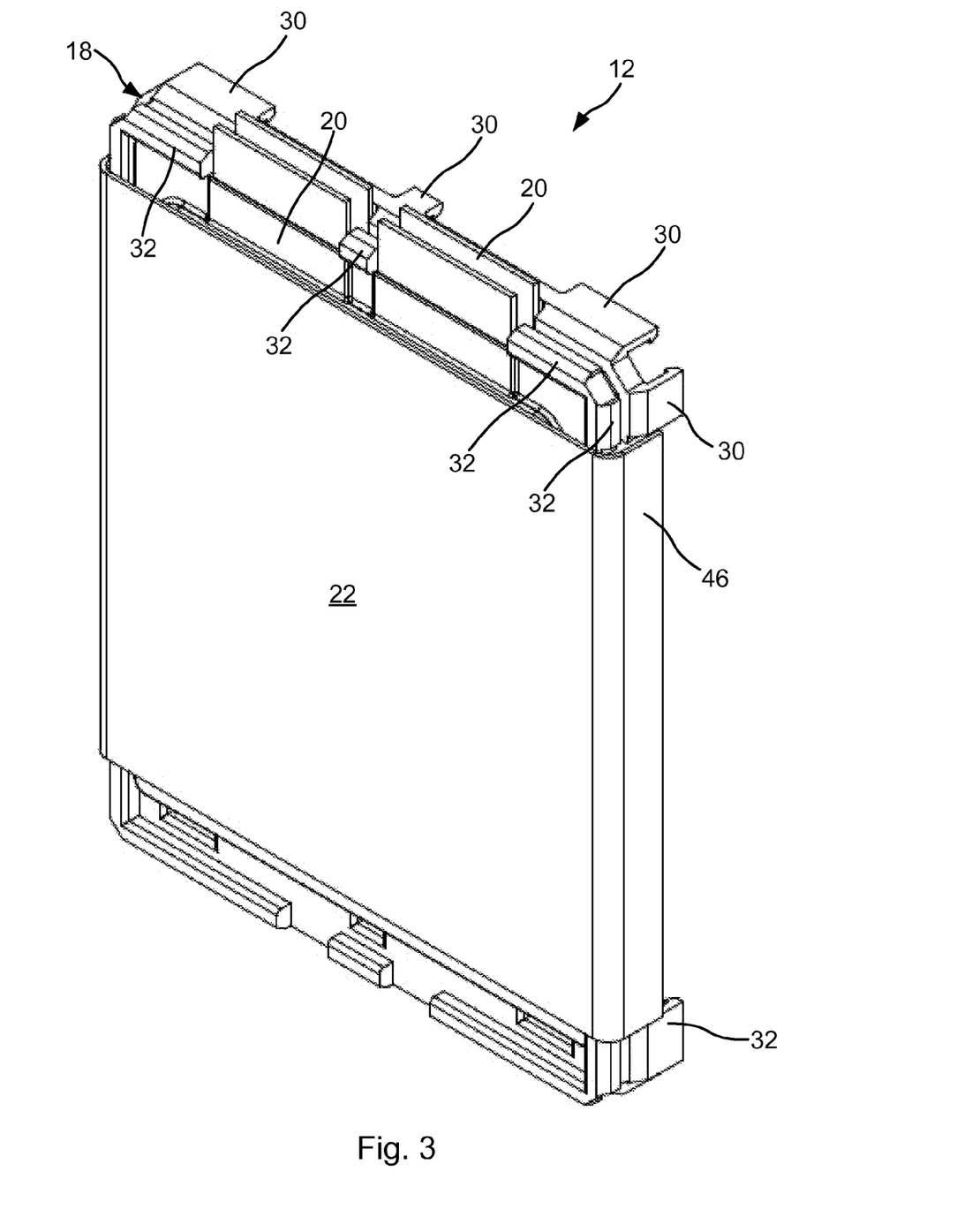
FIG. 3 is an isometric view of one of the interlocking sub-assemblies.
Figure 4:
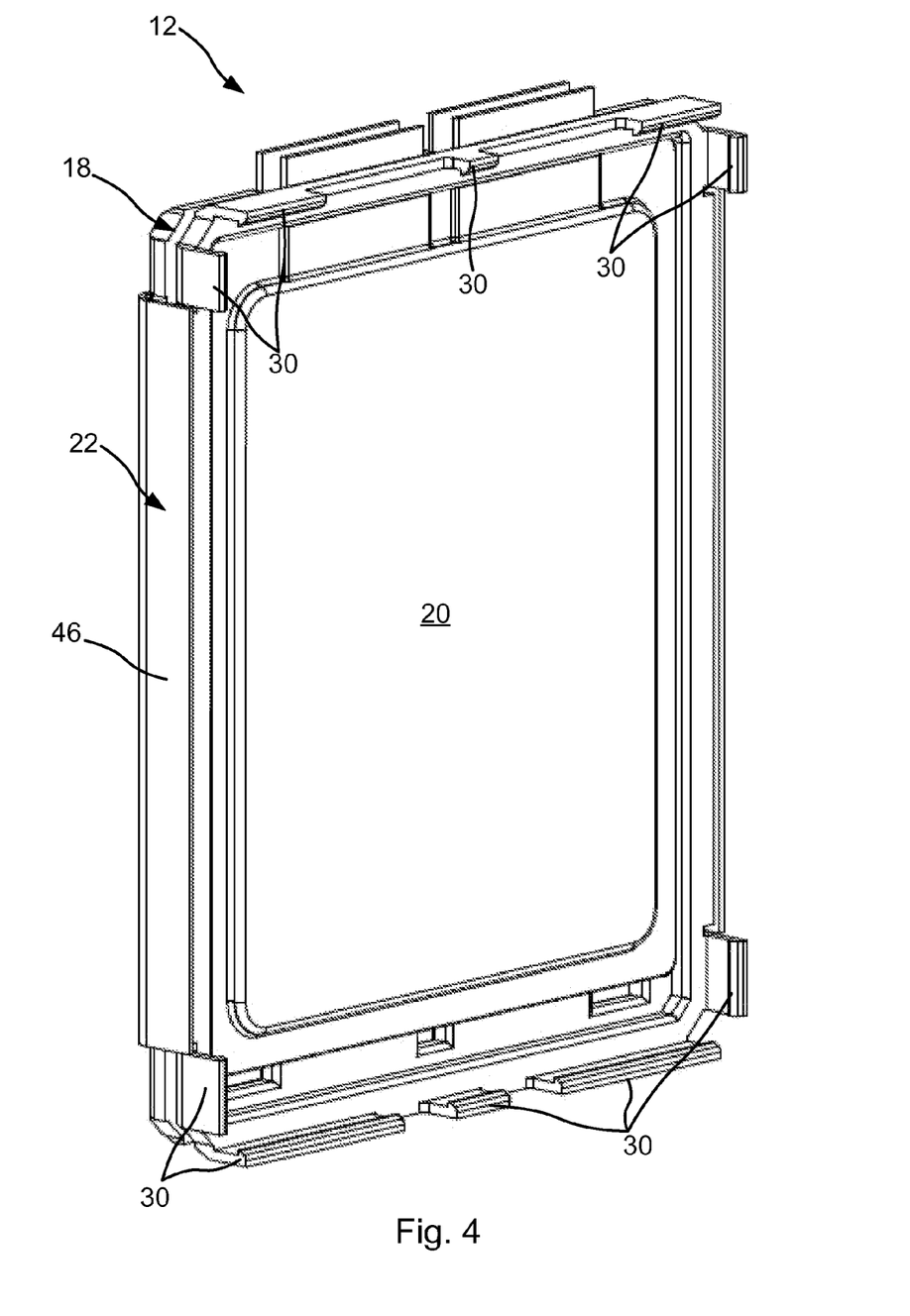
FIG. 4 is a second isometric view of one of the interlocking sub-assemblies.

Each cell assembly 12 may include a frame 18 which provides a structure that carries and supports one or more battery cells 20 and one or more thermal transfer sheets 22. Frame 18 is sized and configured to receive one or more battery cells 20 therein. Accordingly, frame 18 is generally rectangular, formed by four legs 24 that define an open interior 26. Frame 18 may include one or more inwardly extending ledges 28 configured to secure or otherwise position the battery cell(s) 20 therein.

Each frame 18 may include one or more hooked projections 30 that extending forwardly. Each frame 18 may further include one or more matching hooked receivers 32 extending rearwardly from the frame. In this manner, when positioned adjacent to one another, the forwardly extending hooked projections 30 will engage and latch in the matching hook receiver 32 of the adjacent frame 18. Thus, a plurality of cell assemblies 12 may be easily assembled and attached to one another in a stacked configuration.

Figures 5, 6:
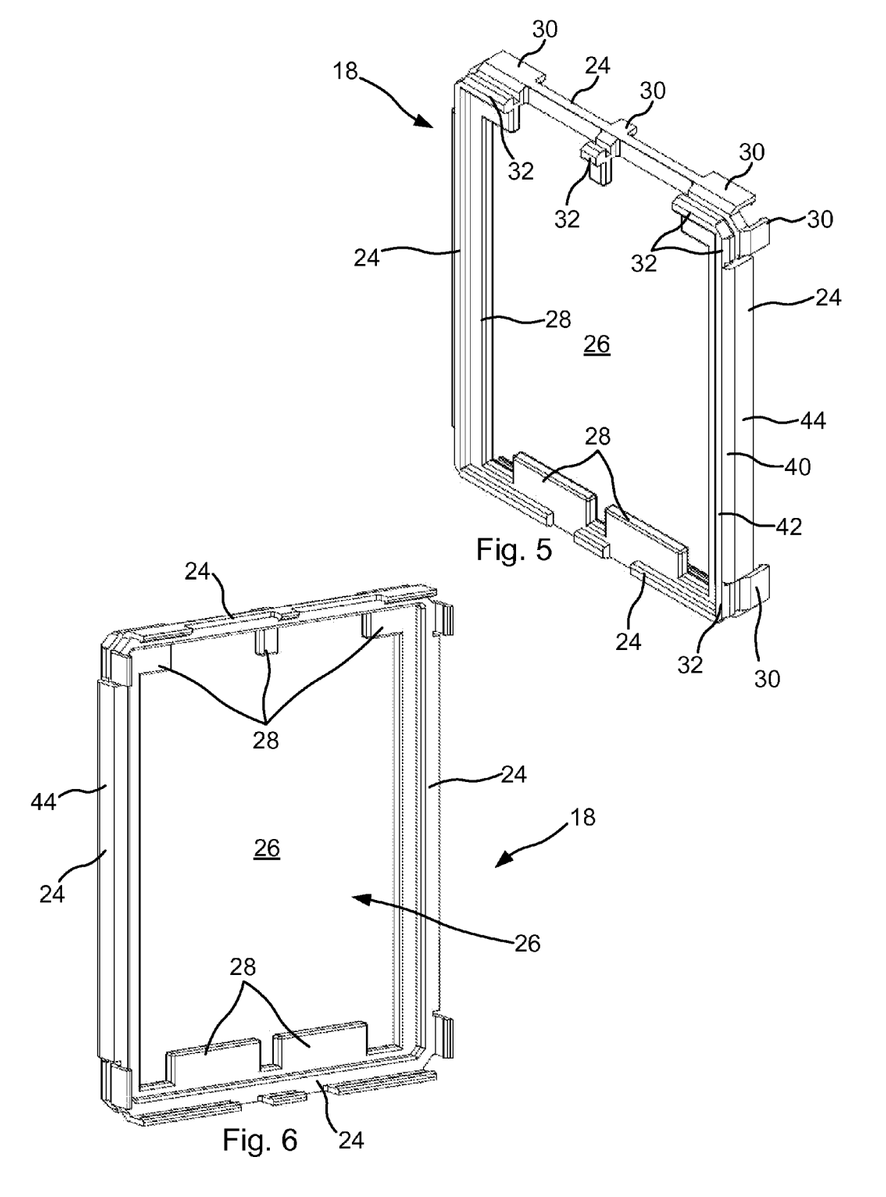
FIG. 5 is an isometric view of the frame.
FIG. 6 is a second isometric view of the frame.
Figure 7:
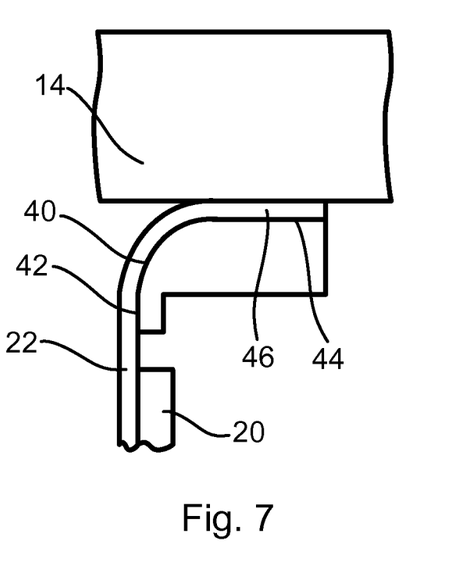
FIG. 7 is an enlarged section view of the frame, battery cell and heat sink.
Figure 8:
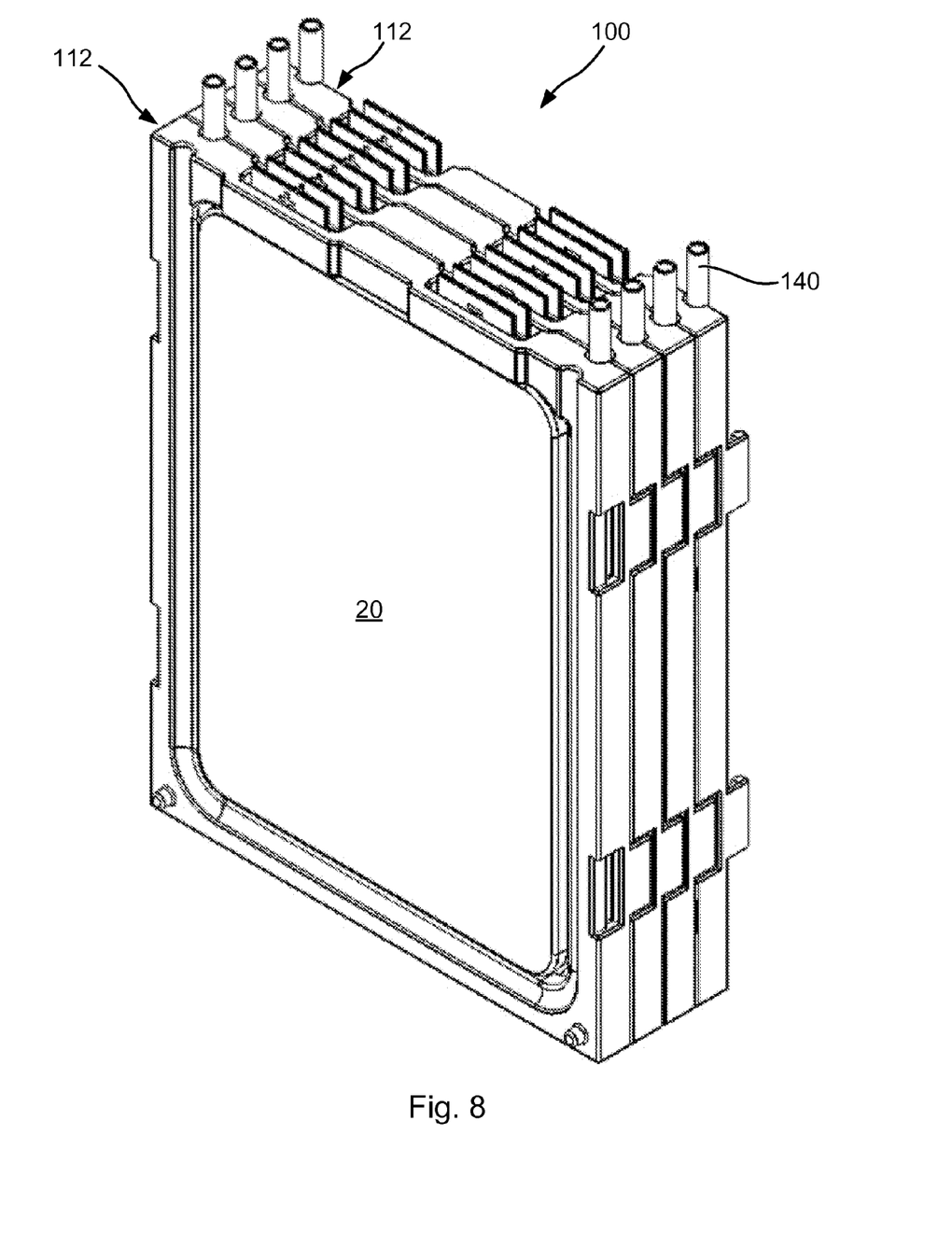
FIG. 8 is an isometric view of an alternate battery pack assembly.

In one embodiment, one leg 24 may include a curved outer edge 40. In other embodiments, two opposed legs 24 include a curved outer edge. In still further embodiments, two or more legs include a curved outer edge. In one or more embodiments, the curved outer edge 40 extends from generally parallel to the rear face 42 of leg 24 to generally parallel to the side face 44 of leg 24. In one embodiment the radius of curved outer edge may be from between about 1 mm and about 10 mm. In other embodiments the radius may be from between about 1 mm and about 5 mm. In these or other embodiments, the radius may be less than about 10 mm. In other embodiments, the radius is less than about 5 mm. The radius of curved outer edge should be greater than the minimum bend radius of the thermal transfer sheet 22 to prevent cracking of the thermal transfer sheet. Thermal conductivity is enhanced by advantageously maintaining the graphite thermal transfer sheet in a contiguous form, without cracks or other disruptions to structure.

As can be seen, the thermal transfer sheet 22 may be bent from a configuration generally parallel to rear face 42 of leg 24 to a configuration generally parallel to, and flush with the side face 44 of leg 24. When assembled, a portion 46 of thermal transfer sheet 22 is thereby positioned between the side face 44 and heat sink 14. Thus, thermal transfer sheet 22 is in operative thermal contact with at least one major surface of a battery cell 20, preferably the major surface of two adjacent battery cells 20, and further with the heat sink 14. In this manner, thermal transfer sheet 22 may efficiently spread and conduct thermal energy from the battery cells 20 to the heat sink 14 where it may be thereafter may be transferred to ambient air or otherwise removed.

Figure 2:
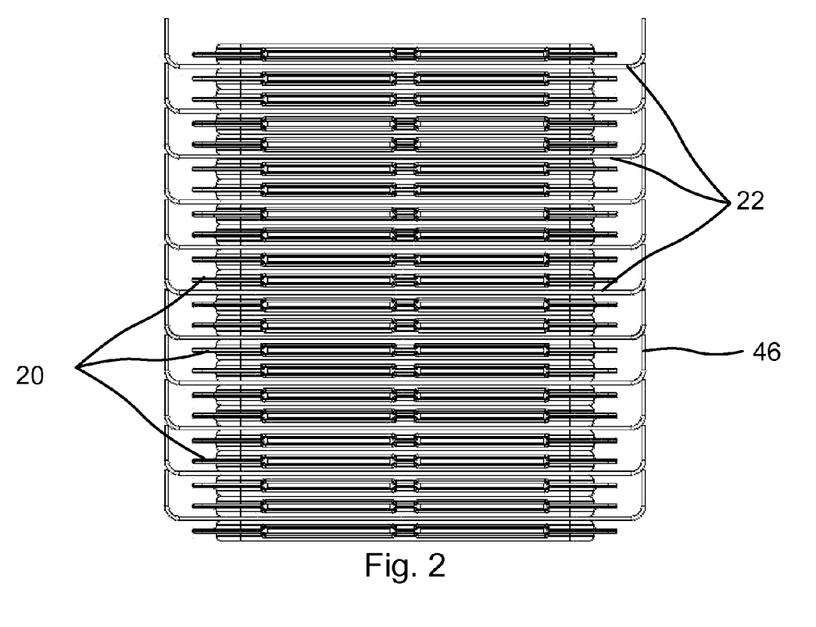
FIG. 2 is a top view of the battery pack assembly with heat sinks and frames removed to show the stacked cells with heat spreaders positioned therebetween.

Thermal transfer sheet 22 is positioned between at least two adjacent battery cells 20. In one embodiment, the transfer sheet 22 contacts the major surface of one cell 20 in the cell assembly 12 and the major surface of a cell 20 in an adjacent cell assembly 12. Though the figures show two cells per cell assembly 12, it should be appreciated that each cell assembly 12 may include only one cell 20, in which case, the thermal transfer sheet 22 is positioned between each battery cell 20 in the battery pack 10. In still further embodiments, a thermal transfer sheet 22 is positioned between every other battery cell 20 in battery pack 10. In these or other embodiments, the thermal transfer sheet 22 is in contact with at least 70 percent of the major surface of the battery cell 20 facing the thermal transfer sheet 22. In other embodiments, the thermal transfer sheet 22 is in contact with at least 90 percent of the major surface of the battery cell 20 facing the thermal transfer sheet 22. In still further embodiments, the thermal transfer sheet 22 is in contact with substantially the entire major surface of the battery cell 20 facing the thermal transfer sheet 22.

The curved outer edge 40 and side face 44 function as a mandrel to enable the thermal transfer sheet 22 to be bent and positioned in proper location during assembly. The above battery pack assembly 10 may be advantageously assembled according to the following method. The cell(s) 20 may be positioned inside the frame 18. The generally flat thermal transfer sheet 22 may be positioned adjacent to major surface of the rear cell 20. Because of the relative flexibility of the thermal transfer sheet 22, they may be bent in-situ. The thermal transfer sheet 22 may then be bent over curved outer edge(s) 40 and drawn into contact with side face 44. In one embodiment the transfer sheet 22 may include an adhesive coating on at least one side. Thus, the thermal transfer sheet 22 may be held in place when the adhesive coating contacts the major surface of the battery cell 20, rear face 42, curved outer edge 40 and side face 44. The cell assembly 12 may then be secured to other cell assemblies 12 in the manner described above to create battery cell stacks.

Each thermal transfer sheet 22 may be optionally thin and sheet-like, having two opposed major surfaces. In one embodiment, the thermal transfer sheet 22 may be less than about 2 mm thick. In other embodiments the thermal transfer sheet 22 may be less than about 1 mm thick. In still other embodiments, the thermal transfer sheet may be less than about 0.5 mm thick. According to one or more embodiments, thermal transfer sheet 22 may be a sheet of a compressed mass of exfoliated graphite particles, a sheet of graphitized polyimide or combinations thereof.

Each thermal transfer sheet 22 may have an in-plane thermal conductivity of greater than about 250 W/mK at about room temperature (using the Angstrom method to test at room temperature being approximately 25° C.). In another embodiment the in-plane thermal conductivity of thermal transfer sheet 22 is at least about 400 W/mK. In yet a further embodiment, the in-plane thermal conductivity of thermal transfer sheet 22 may be at least about 550 W/mK. In additional embodiments, the in-plane thermal conductivity may range from at least 250 W/mK to at least about 1500 W/mK. It is further preferred that at least one of the thermal transfer sheets has an in-plane thermal conductivity of at least about twice the in-plane thermal conductivity of aluminum. Furthermore, each thermal transfer sheet 22 may have the same or different in-plane thermal conductivities. Any combination of the above in-plane thermal conductivities may be practiced. In one embodiment, the graphite sheet material may be from 10 to 1500 microns thick. In other embodiments the graphite sheet material may be from 20 to 40 microns thick. Suitable graphite sheets and sheet making processes are disclosed in, for example, U.S. Pat. Nos. 5,091,025 and 3,404,061, the contents of which are incorporated herein by reference.

In an optional embodiment, one or more thermal transfer sheets 22 may be resin reinforced. The resin may be used, for example, to improve the rigidity of the thermal transfer sheet 22 and/or the impermeability of thermal transfer sheet 22. In combination with resin reinforcement, or in the alternative, one or more thermal transfer sheets 22 may include carbon and/or graphite fiber reinforcement. Preferably, thermal transfer sheet 22 may include a sufficient amount of reinforcement to assist with or provide structural integrity to thermal transfer sheet 22.

Thermal transfer sheet 22 is a more conformable material than conventional materials used in a pack for heat spreading (ex. aluminum). Use of thermal transfer sheet 22 offers a reduction in interfacial thermal heat transfer resistance between thermal transfer sheet 22 and cell 20 as compared to cell 20 and a conventional material for the thermal transfer sheet. Because thermal transfer sheet 22 is more conformable, interfacial thermal heat transfer between cells 20 having non-flat major surfaces is better than conventional materials. The conformability and the resulting reduction in interfacial thermal heat transfer resistance can reduce or even eliminate the need to apply a thermally conductive grease or paste to the surface of the thermal transfer sheet 22, as is commonly practiced to overcome the interfacial resistance of conventional materials.

If inter-cell electrical isolation is desired, thermal transfer sheet 22 may optionally be coated with an electrically insulating film on one or both major surfaces, wherein the film is substantially thin enough not to appreciably impede heat transfer to the thermal transfer sheet 22. Exemplary films include PET and polyimide films. Thermal transfer sheets may further include a surface treatment such as corrugation or knurling to help reduce the minimum possible bend radius without substantially reducing the thermal conductivity thereof.

Thermal transfer sheet 22 may optionally be coated with a film adhesive on one or both major surfaces, wherein the adhesive layer is thin enough not to appreciably impede heat transfer to the thermal transfer sheet. The use of thermal transfer sheets 22 incorporating an adhesive layer and supplied on a release liner can simplify the assembly of the battery pack by enabling "peel and stick" application to individual battery cells. Additionally, battery packs assembled with thermal transfer sheet 22 incorporating the film adhesive may reduce or substantially eliminate the need for potting compounds (such as silicone or polyurethane) used to prevent cells from shifting under inertial forces and vibration, as is commonly practiced in battery pack constructions incorporating conventional thermal transfer materials.

In one embodiment, at least one of the spaces between adjacent thermal transfer sheets 22 or between the thermal transfer sheet 22 and an adjacent cell 20 may be at least partially filled with a layer of a phase change material. In another embodiment at least one of the spaces between adjacent thermal transfer sheets 22 or between the thermal transfer sheet 22 and an adjacent cell 20 is completely filled with a layer of a phase change material. In these or other embodiments, substantially all of the spaces between the thermal transfer sheets 22 or between the thermal transfer sheets 22 and the adjacent cells 20 includes a phase change material. The phase change material may be free flowing and contained or bound at least partially by the thermal transfer sheets 22. Alternately, the phase change material may be physically adsorbed into a carrying matrix. For example, the phase change material may be absorbed and carried in a compressed expanded graphite mat or carbon foam. The phase change material would help reduce the magnitude and speed of temperature changes in the battery pack. The melting temperature range of the phase change material may advantageously be approximately equal to the recommended operating temperature range for the battery cells within the battery pack. An example of a suitable phase change material is a paraffin wax.

With reference now to FIGS. 8-12, an alternate embodiment of a battery pack is shown and generally indicated by the numeral 100 and wherein like numerals indicate like elements. Battery pack 100 includes a plurality of cell assemblies 112 which, as described above, may be arranged in an interconnected stacked configuration.

Figure 9:
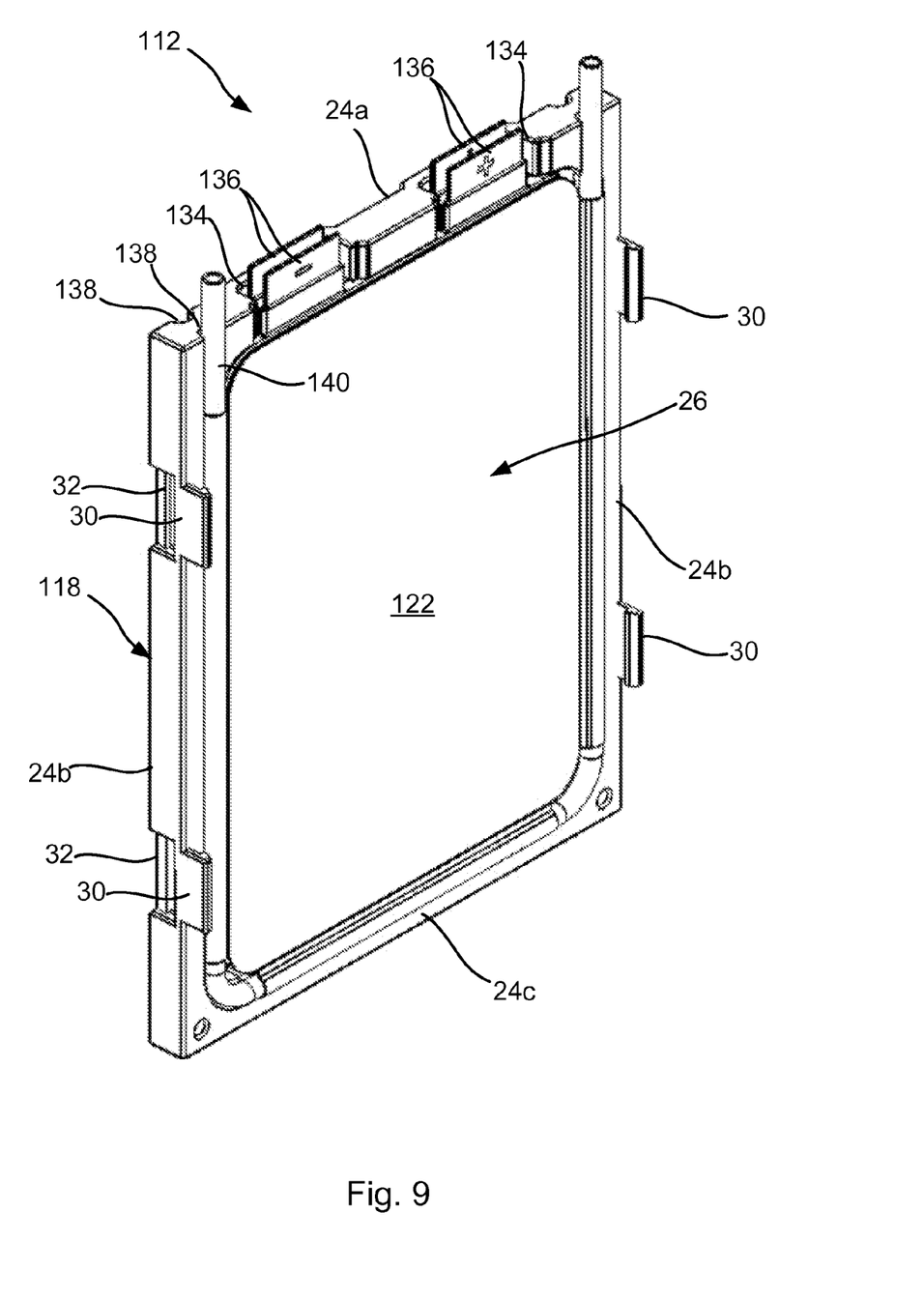
FIG. 9 is an isometric view of one interlocking sub-assembly of the battery pack of FIG. 8.
Figure 10:
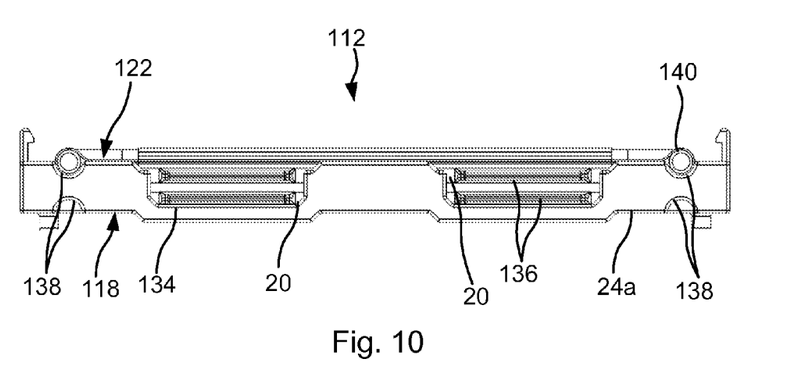
FIG. 10 is a top view of the sub-assembly of FIG. 9.
Figure 11:
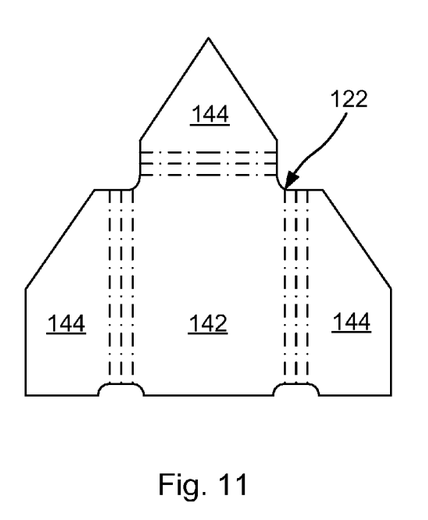
FIG. 11 is an elevation view of a thermal transfer sheet in the un-assembled and un-folded configuration.

Each cell assembly 112 may include a frame 118 which provides a structure that carries and supports one or more battery cells 20 and one or more thermal transfer sheets 122. Frame 118 is sized and configured to receive one or more battery cells 20 therein. Accordingly, frame 118 is generally rectangular, formed by four legs 24 that define an open interior 26. Frame 118 may include one or more inwardly extending ledges configured to secure or otherwise position the battery cell(s) 20 therein.

Each frame 118 may include one or more hooked projections 30 extending forwardly. Each frame 118 may further include one or more matching hooked receivers 32 extending rearwardly from the frame. In this manner, when positioned adjacent to one another, the forwardly extending hooked projections 30 will engage and latch in the matching hook receiver 32 of the adjacent frame 18. Thus, a plurality of cell assemblies 112 may be easily assembled and attached to one another in a stacked configuration.

A top leg 24a includes notches 134 through which electrical leads 136 of battery cells 20 may extend. Side legs 24b and bottom leg 24c include a channel 138 on opposed sides and extending the length thereof. As can be seen, in this manner a contiguous generally U-shaped channel is formed on both sides of each frame 118. In one embodiment the cross-section of channel 138 is generally half-circle shaped. Channel 138 is configured to receive a conduit 140 therein. A fluid may be directed through the conduit 140 to remove thermal energy from the cell assembly 112 as will be described in greater detail below.

The thermal transfer sheet 122 includes a central portion 142 that is generally rectangular. In one embodiment the central portion 142 is substantially the same area as the major surface of the battery cell 20. Thermal transfer sheet 122 further includes one or more tabs 144 extending from the central portion 142. In the embodiment shown in FIGS. 11 and 12, thermal transfer sheet 122 includes three tabs 144, however it should be appreciated that more or fewer tabs may be used. Each tab 144 is configured to be folded over a portion of conduit 140 and back onto central portion 142. By folding the tab 144 over the conduit 140, a large portion of the conduit 140 is placed in physical contact with thermal transfer sheet 122 which in turn increases the thermal transfer from thermal transfer sheet 122 to conduit 140 and ultimately into the fluid flowing in conduit 140. In one embodiment, the tabs 144, when folded, cover substantially the entire area of the central portion 142. In this or other embodiments, the thermal transfer sheet includes two (2) tabs 144, in still other embodiments, the thermal transfer sheet 142 includes three (3) tabs 144. Tabs 144 may be sized and configured so that the total area of the tabs 144 is substantially the same as the central portion 142. In other embodiments, tabs 144 may be sized and configured so that the total area of the tabs is at least about 50 percent, more advantageously at least about 75 percent and still more advantageously at least about 90 percent of the central portion 142. Furthermore, Tabs 144 may be sized and configured so as to advantageously reduce the thermal gradients inherent in certain battery cell designs.

Figure 12:
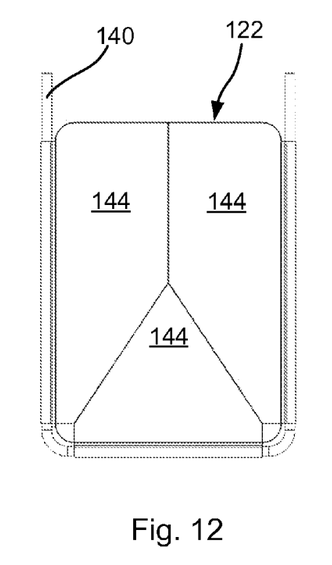
FIG. 12 is a side view of the thermal transfer sheet in the folded configuration around a thermal transfer tube

When assembled, thermal transfer sheet 122 is thereby in operative thermal connection with the conduit 140. Thus, thermal transfer sheet 122 is in operative thermal contact with at least one major surface of a battery cell 20, preferably the major surface of two adjacent battery cells 20, and further with the conduit 140. In this manner, thermal transfer sheet 22 may efficiently spread and conduct thermal energy from the battery cells 20 to the conduit 140 where it may be thereafter may be transferred to the fluid flowing therein.

Thermal transfer sheet 122 is positioned between at least two adjacent battery cells 20. In one embodiment, the transfer sheet 122 contacts the major surface of one cell 20 in the cell assembly 112 and the major surface of a cell 20 in an adjacent cell assembly 112. Though the figures show two cells per cell assembly 12, it should be appreciated that each cell assembly 12 may include only one cell 20, in which case, the thermal transfer sheet 22 is positioned between each battery cell 20 in the battery pack 100. In still further embodiments, a thermal transfer sheet 122 is positioned between every other battery cell 20 in battery pack 10. In these or other embodiments, the thermal transfer sheet 122 is in contact with at least 70 percent of the major surface of the battery cell 20 facing the thermal transfer sheet 122. In other embodiments, the thermal transfer sheet 122 is in contact with at least 90 percent of the major surface of the battery cell 20 facing the thermal transfer sheet 122. In still further embodiments, the thermal transfer sheet 122 is in contact with substantially the entire major surface of the battery cell 20 facing the thermal transfer sheet 122. Because the thermal transfer sheet 122 is folded over on itself, effectively two stacked thermal transfer sheets are positioned between each adjacent battery cell. This configuration may advantageously improve the thermal shielding between adjacent battery cells.

In any one or more of the above embodiments, the thermal transfer sheet 22/122 may further be a composite material. For example, each thermal transfer sheet may include a pair of graphite sheets having a phase change material disposed therebetween. The phase change material may be free flowing and contained or bound by the graphite sheets. Alternately, the phase change material may be physically adsorbed into a carrying matrix that is positioned between the opposed graphite sheets. For example, the phase change material may be absorbed and carried in compressed expanded graphite mat or carbon foam. In the alternative, the composite material may include a single graphite sheet layer secured to a single carrying matrix layer having the phase change material absorbed therein. In still other embodiments, thermal transfer sheet 22/122 may include a single layer of graphite sheet material having the phase change material absorbed therein.

The above described assembly simplifies assembly because assembly and bending of the thermal transfer sheet may be accomplished in the same step without tooling or additional molds. Further, the continuity of the graphite structure is not degraded during bending. Still further, the frame construction allows easy assembly and disassembly of battery cell stacks.

The disclosures of all cited patents and publications referred to in this application are incorporated herein by reference in their entirety. The various embodiments disclosed herein may be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:
1. A battery pack comprising:
   a plurality of cell assemblies in a stacked configuration, each cell assembly comprising
   at least one prismatic battery;
   a frame having a plurality of legs sized and configured to be positioned around the at least one prismatic battery, at least one leg including a rear face, curved outer edge and a side face, the frame including a forwardly extending hooked projection and rearwardly extending hooked receiver matching the hooked projection for latchingly engaging a hooked projection of an adjacent frame of another one of said plurality of cell assemblies; and
   a thermal transfer sheet made from a sheet of flexible graphite, each said thermal transfer sheet being positioned to contact a major surface of the at least one prismatic battery and bent over in contact with the curved outer edge; and
   a heat sink, at least a portion of each of said thermal transfer sheets being secured between said heat sink and said side faces of said frames of said plurality of cell assemblies.

2. The battery pack of claim 1 wherein said curved outer edge includes a radius between about 1 mm and about 10 mm.

3. The battery pack of claim 1 wherein said curved outer edge includes a radius of between about 2 mm and about 5 mm.

4. The battery pack of claim 1 wherein said sheet of a compressed mass of exfoliated graphite particles includes an in-plane thermal conductivity of at least about 250 W/mK.

5. The battery pack of claim 1 wherein said sheet of a compressed mass of exfoliated graphite particles includes an in-plane thermal conductivity of at least about 400 W/mK.

6. The battery pack of claim 1 each said cell assembly includes two prismatic batteries.

7. The battery pack of claim 1 wherein said heat sink is made of a thermally conductive metal and includes fins.

8. The battery pack of claim 1 wherein said heat sink comprises a manifold through which a thermal transfer medium flows.

9. The battery pack of claim 1 wherein two opposed legs of said frame include said curved outer edge.

10. The battery pack of claim 1 wherein said thermal transfer sheet comprises a minimum bend radius achievable without cracking said thermal transfer sheet, wherein the radius of said curved sidewall is greater than the minimum bend radius to prevent cracking of said thermal transfer sheet.

11. A battery pack comprising:
   a plurality of cell assemblies each comprising
      at least one prismatic battery having opposed major surfaces;
      a frame having a plurality of legs sized and configured to be positioned around the at least one prismatic battery;
      a fluid conduit extending along at least one of said plurality of legs, said conduit having an outer surface; and
      a thermal transfer sheet made from a sheet of flexible graphite and having opposed major surfaces, said thermal transfer sheet having a central portion and at least one tab extending from said central portion, one major surface of said central portion contacting at least one of said major surfaces of the at least one prismatic battery and the other of said major surface of said central portion being at least partially covered by said at least one tab folded over said fluid conduit outer surface.

12. The battery pack of claim 11 wherein said frame further includes forwardly extending hooked projections and rearwardly extending hook receivers, said hooked receivers matching said hooked projections for latchingly engaging hooked projections of an adjacent frame of another one of said cell assemblies.

13. The battery pack of claim 11 wherein said thermal transfer sheet comprises three tabs, each said tab being wrapped around said fluid conduit outer surface.

14. The battery pack of claim 11 wherein said one or more tabs cover substantially the entire major surface area of one side of said central portion.

15. The battery pack of claim 11 wherein said sheet of flexible graphite includes an in-plane thermal conductivity of at least about 400 W/mK.

16. The battery pack of claim 11 each said cell assembly includes two prismatic batteries.

17. The battery pack of claim 11 wherein said sheet of flexible graphite comprises one of compressed expanded particles of natural graphite and graphitized polyimide film.

18. The battery pack of claim 11 wherein at least one of said plurality of legs includes a channel configured to at least partially receive said conduit.

19. The battery pack of claim 18 wherein said channel is generally U-shaped and extends along at least three of said plurality of legs.

20. The battery pack of claim 18 wherein said channel is disposed on opposite sides of said at least one of said plurality of legs.

* * * * *